A. KAHANOWICZ.
SELF REGISTERING MEASURING RULE.
APPLICATION FILED AUG. 4, 1913.
1,096,376.
Patented May 12, 1914.
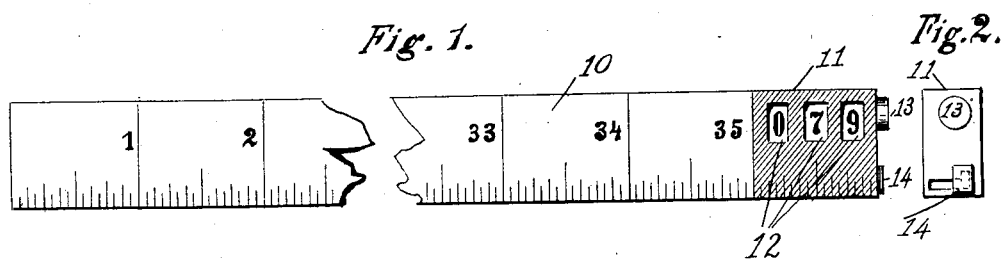
WITNESSES:
INVENTOR

UNITED STATES PATENT OFFICE.

ALEXANDER KAHANOWICZ, OF NEW YORK, N. Y.

SELF-REGISTERING MEASURING-RULE.

1,096,376.  Specification of Letters Patent.  Patented May 12, 1914.

Application filed August 4, 1913. Serial No. 782,991.

*To all whom it may concern:*

Be it known that I, ALEXANDER KAHANOWICZ, a subject of the Austro-Hungarian Emperor, residing at the city of New York, county and State of New York, have invented a new and useful Self-Registering Measuring-Rule, of which the following is a specification.

This invention relates to a measuring rule which is so constructed that a count of the yards or other lengths measured off may be mechanically maintained, so that the operator is relieved from mental strain and is not liable to make a miscount.

In the accompanying drawing: Figure 1 is a front view partly broken away of a measuring rule embodying my invention, and Fig. 2 is a right hand end view thereof.

The measuring rule comprises a graduated stick 10, which is somewhat shorter than the measuring length of said rule, and to one end of which is secured a casing 11, having the same cross sectional configuration as the stick 10, the aggregate length of stick and casing constituting the measuring length of the rule.

Within casing 11, there is wholly housed a counting mechanism, the construction of which does not constitute part of the present invention, the units, tens and hundreds of said mechanism, being adapted to be exposed through corresponding openings or windows 12 of the casing. The counting mechanism is actuated by a push button 13, extending outwardly through the end plate of the casing, the construction being such, that each pressure on said button will advance the count for one figure. The return to zero means of the counting mechanism are operable by a finger piece 14 that likewise extends through the end plate of the casing.

In use the operator presses on the finger piece once as he measures off each yard, so that he can readily ascertain the total number of measured lengths by the figures exposed through the openings 12. In this way any mental carrying of the measured off lengths is entirely dispensed with, and mistakes are not liable to occur.

I claim:

A measuring rule comprising a measuring stick which is short of the measuring length of said rule, a casing having substantially the same cross-sectional configuration as the measuring stick and secured to one end thereof, the aggregate length of stick and casing constituting the measuring length of the rule, a counter wholly housed within the casing and exteriorly accessible means on the casing for operating the counter.

In testimony whereof I affix my signature in presence of two witnesses.

ALEXANDER KAHANOWICZ.

Witnesses:
 ALBERT W. BLAKEMAN,
 ALBERT J. KAELIN.

---

Copies of this patent may be obtained for five cents each, by addressing the "Commissioner of Patents, Washington, D. C."